US010723569B2

(12) United States Patent
Albert

(10) Patent No.: US 10,723,569 B2
(45) Date of Patent: Jul. 28, 2020

(54) APPARATUS AND METHOD FOR REPEATEDLY SEPARATING AND DISPLACING A TOPMOST BAG OF A STACK OF BAGS

(71) Applicant: PREMIER TECH TECHNOLOGIES LTEE, Riviere-du-Loup (CA)

(72) Inventor: André Albert, Riviere-du-Loup (CA)

(73) Assignee: Premier Tech Technologies LTEE, Quebec (Quebec) (CA)

( * ) Notice: Subject to any disclaimer, the term of this patent is extended or adjusted under 35 U.S.C. 154(b) by 0 days.

(21) Appl. No.: 15/555,584

(22) PCT Filed: Mar. 2, 2016

(86) PCT No.: PCT/CA2016/050219
§ 371 (c)(1),
(2) Date: Sep. 5, 2017

(87) PCT Pub. No.: WO2016/141462
PCT Pub. Date: Sep. 15, 2016

(65) Prior Publication Data
US 2018/0050874 A1 Feb. 22, 2018

Related U.S. Application Data

(60) Provisional application No. 62/129,089, filed on Mar. 6, 2015.

(51) Int. Cl.
*B65G 59/02* (2006.01)
*B65H 3/54* (2006.01)
(Continued)

(52) U.S. Cl.
CPC ......... *B65G 59/026* (2013.01); *B65G 59/045* (2013.01); *B65H 3/0825* (2013.01);
(Continued)

(58) Field of Classification Search
CPC ...... B65G 59/026; B65G 59/045; B65H 5/14; B65H 5/10; B65H 3/0883; B65H 3/0825;
(Continued)

(56) References Cited

U.S. PATENT DOCUMENTS 2,145,764 A * 1/1939 Goebel ................ B65H 3/0816
271/16
3,100,110 A 8/1963 Winkler et al.
(Continued)

FOREIGN PATENT DOCUMENTS

JP 10120211 A 5/1998

*Primary Examiner* — Lynn E Schwenning
(74) *Attorney, Agent, or Firm* — Eversheds Sutherland (US) LLP

(57) ABSTRACT

An apparatus for repeatedly separating and displacing a topmost bag between a bag stack location and a second location. The apparatus comprises a separating manipulator having a prehension end-effector selectively activable/deactivable to seize and maintain the topmost bag and subsequently release the topmost bag. The separating manipulator is selectively configurable in a bag engaging configuration to seize a separation section of the topmost bag and a lifted configuration where the prehension end-effector is spaced-apart from a second topmost bag of the stack. The displacing manipulator has a prehension end-effector selectively activable/deactivable to seize and maintain a displacement engagement section of and to subsequently release the topmost bag. The prehension end-effector is translatable along the displacement axis "X" to displace the topmost bag between the bag stack location and the second location. A method for repeatedly separating and displacing a topmost bag of a stack of bags is also provided.

20 Claims, 8 Drawing Sheets

(51) Int. Cl.
*B65H 5/10* (2006.01)
*B65H 5/14* (2006.01)
*B65H 3/08* (2006.01)
*B65G 59/04* (2006.01)

(52) U.S. Cl.
CPC ............. *B65H 3/0883* (2013.01); *B65H 3/54* (2013.01); *B65H 5/10* (2013.01); *B65H 5/14* (2013.01); *B65H 2555/30* (2013.01); *B65H 2701/191* (2013.01)

(58) Field of Classification Search
CPC . B65H 3/54; B65H 2701/191; B65H 2555/30
See application file for complete search history.

(56) References Cited

U.S. PATENT DOCUMENTS

| | | | | |
|---|---|---|---|---|
| 3,625,507 | A * | 12/1971 | Lucius | B65H 3/02 271/33 |
| 4,458,891 | A * | 7/1984 | Kawaguchi | B65H 3/0883 271/93 |
| 6,030,171 | A * | 2/2000 | Johnson | B65H 1/14 414/797 |
| 6,345,818 | B1 | 2/2002 | Stephan et al. | |
| 6,481,953 | B1 * | 11/2002 | Michel | B65H 3/0825 271/91 |
| 6,886,827 | B2 * | 5/2005 | Dachtler | B65H 3/0816 271/106 |
| 7,926,802 | B2 * | 4/2011 | Shimokawa | B65H 3/0825 271/103 |
| 2001/0015520 | A1 * | 8/2001 | Gauger | B65H 3/0825 271/18.1 |
| 2003/0155701 | A1 | 8/2003 | Bakodledis | |
| 2012/0063878 | A1 * | 3/2012 | DaCunha | B07C 1/04 414/797.6 |
| 2014/0075896 | A1 * | 3/2014 | Albert | B65B 43/44 53/571 |
| 2014/0169925 | A1 * | 6/2014 | Bando | B65G 49/069 414/797 |
| 2015/0360883 | A1 * | 12/2015 | Taiana | B21D 43/22 414/788.4 |

* cited by examiner

APPARATUS AND METHOD FOR REPEATEDLY SEPARATING AND DISPLACING A TOPMOST BAG OF A STACK OF BAGS

CROSS REFERENCE TO RELATED APPLICATION

This application claims the benefit under 35 U.S.C. § 119(e) of U.S. provisional patent application No. 62/129,089 which was filed on Mar. 6, 2015. The entirety of the aforementioned application is herein incorporated by reference.

TECHNICAL FIELD OF THE INVENTION

The present invention relates to the field of bag preparation. More particularly, it relates to an apparatus for repeatedly separating a topmost bag from an initial location on top of a stack of bags and displacing the separated bag to a subsequent location distal from the initial location and to a method for performing the same.

BACKGROUND

It is known in the art to use manipulators to repeatedly remove a topmost bag from a stack of bags, where empty bags are stacked one over the other in a substantially horizontal orientation, and move the topmost bag towards a second location distal from an initial location on the top of the stack, for example, for subsequent handling by other manipulators in a production line.

In order to perform such repetitive removal and displacement of the topmost bag from a stack of bags, the manipulator must repeatedly: seize the topmost bag, maintain the topmost bag during displacement thereof and release the topmost bag at the second location distal from the initial location on the top of the stack. During such operations, the bags located below the topmost bag in the stack must remain substantially still (i.e. they must remain substantially in place in the stack), in order to be positioned correctly for the subsequent removal and displacement of the successive topmost bags of the stack (following the removal and displacement of former topmost bags).

Known manipulators are however often not adapted to perform such repetitive removal and displacement of the topmost bag, from a stack of bags which are not easily separable from one another, such as, for example and without being limitative, porous bags or other types of bags which tend to stick to one another. Indeed, when performing displacement of a topmost bag of a stack of porous bags, for example, it is common for bags located below the topmost bag to stick to the bag located directly above and therefore be displaced of at least a portion of the distance of displacement of the topmost bag. Moreover, it is common for the second topmost bag to stick to the topmost bag and therefore be removed from the stack and moved to the predefined second location along with the topmost bag, i.e. resulting in the removal and displacement of two bags rather than a single one. Such displacement of additional bags of the stack along with the topmost bag thereof is non-desirable and can cause multiple problems in a production line.

In view of the above, there is a need for an improved apparatus for repeatedly separating and displacing a topmost bag from a stack of bags and for a method for performing the same, which would be able to overcome or at least minimize some of the above-discussed prior art concerns.

BRIEF SUMMARY OF THE INVENTION

According to a first general aspect, there is provided an apparatus for repeatedly separating and displacing a topmost bag from a stack of bags between a bag stack location and a second location. The stack of bags includes a second topmost bag located immediately under the topmost bag in the stack. Each one of the topmost bag and the second topmost bag extends along a displacement axis "X" defined between a first end and an opposed second end of the stack. The apparatus comprises a separating manipulator and a displacing manipulator. The separating manipulator has a prehension end-effector selectively activable to seize and maintain the topmost bag and selectively deactivable to release the topmost bag. The separating manipulator is selectively configurable in a bag engaging configuration to seize a separation section of the topmost bag, proximate to the first end of the stack, and a lifted configuration where the prehension end-effector is spaced-apart from the second topmost bag. The displacing manipulator has a prehension end-effector selectively activable to seize and maintain a displacement engagement section of the topmost bag and selectively deactivable to release the topmost bag. The prehension end-effector is translatable along the displacement axis "X" to displace the topmost bag between the bag stack location and the second location.

In an embodiment, the apparatus further comprises a holding manipulator selectively configurable in a bag holding configuration to abut the second topmost bag and a disengaged configuration, spaced-apart from the stack of bags.

In an embodiment, the holding manipulator comprises at least one stack engaging arm sized and shaped to allow the at least one stack engaging arm to brush against a section of the topmost bag when moved from the disengaged configuration to the bag holding configuration.

In an embodiment, the apparatus further comprises a stacking table, a stack level detector and a displacement assembly. The stacking table has a stacking surface to support the stack of bags. The stack level detector detects a vertical position of the topmost bag of the stack of bags. The displacement assembly is operatively connected to the stack level detector and displaces vertically at least one of the stacking table, the separating manipulator, and the displacing manipulator to maintain a predetermined vertical distance between the topmost bag of the stack and at least one of the separating manipulator and the displacing manipulator.

In an embodiment, the displacement assembly comprises a stacking table displacement assembly operatively connected to the stack level detector. The stacking table displacement assembly is configured to repeatedly adjust the vertical position of the stacking table according to the vertical position of the topmost bag detected by the stack level detector.

In an embodiment, the displacing manipulator comprises an actuator operatively connected to the prehension end-effector. The actuator displaces the prehension end-effector along the displacement axis "X".

In an embodiment, the actuator displaces the prehension end-effector along the displacement axis "X" at a speed over about 0.25 m/s.

In an embodiment, the actuator displaces the prehension end-effector along the displacement axis "X" at an acceleration of at least about 5.5 m/s².

In an embodiment, the actuator displaces the prehension end-effector along the displacement axis "X" in a counter direction towards the first end of the stack and in a displacement direction, opposed to the counter direction, consecutively.

In an embodiment, the separating manipulator has a separating manipulator lifting stroke length and the displacing manipulator has a displacing manipulator lifting stroke length, the separating manipulator lifting stroke length being greater than the displacing manipulator lifting stroke length.

In an embodiment, the prehension end-effector of the separating manipulator comprises a prehension device comprising at least one suction cup.

In an embodiment, the prehension end-effector of the displacing manipulator comprises a prehension device comprising at least one suction cup.

In an embodiment, the displacement engagement section of the topmost bag is located between the second end of the stack and the separation section of the topmost bag, along the displacement axis "X".

According to another general aspect, there is also provided an apparatus for repeatedly separating and displacing a topmost bag from a stack of bags including a second topmost bag located immediately under the topmost bag in the stack. Each one of the topmost bag and the second topmost bag extends along a displacement axis "X" defined between a first end and an opposed second end of the stack and has a separation section proximate to the first end of the stack. The apparatus comprises a stacking table, a separating manipulator, a displacing manipulator, a stack level detector and a displacement assembly. The stacking table has a stacking surface to support the stack of bags. The separating manipulator is engageable with at least one bag of the stack supported by the stacking table and is configurable between a bag engaging configuration and a lifted configuration to separate at least the separation section of the topmost bag from the separation section of the second topmost bag. The displacing manipulator has a prehension end-effector selectively activable to seize and maintain a displacement engagement section of the topmost bag and selectively deactivable to release the topmost bag. The prehension end-effector is translatable along the displacement axis "X" to displace the topmost bag between a bag stack location and a second location. The stack level detector detects a vertical position of the topmost bag of the stack of bags. The displacement assembly is operatively connected to the stack level detector and displaces vertically at least one of the stacking table, the separating manipulator, and the displacing manipulator to maintain a predetermined vertical distance between the topmost bag of the stack and at least one of the separating manipulator and the displacing manipulator.

In an embodiment, the apparatus further comprises a holding manipulator selectively configurable in a bag holding configuration to abut the second topmost bag and a disengaged configuration, spaced-apart from the stack.

In an embodiment, the holding manipulator comprises at least one stack engaging arm sized and shaped to allow the at least one stack engaging arm to brush against a section of the topmost bag when moved from the disengaged configuration to the bag holding configuration.

In an embodiment, the displacement assembly comprises a stacking table displacement assembly operatively connected to the stack level detector. The stacking table displacement assembly is configured to repeatedly adjust the vertical position of the stacking table according to the vertical position of the topmost bag detected by the stack level detector.

In an embodiment, the displacing manipulator comprises an actuator operatively connected to the prehension end-effector. The actuator displaces the prehension end-effector along the displacement axis "X".

In an embodiment, the actuator displaces the prehension end-effector along the displacement axis "X" at a speed over about 0.25 m/s.

In an embodiment, the actuator displaces the prehension end-effector along the displacement axis "X" at an acceleration of at least about 5.5 m/s².

In an embodiment, the actuator displaces the prehension end-effector along the displacement axis "X" in a counter direction towards the first end of the stack and in a displacement direction, opposed to the counter direction, consecutively.

In an embodiment, the separating manipulator has a separating manipulator lifting stroke length and the displacing manipulator has a displacing manipulator lifting stroke length. The separating manipulator lifting stroke length is greater than the displacing manipulator lifting stroke length.

In an embodiment, the prehension end-effector of the displacing manipulator comprises a prehension device comprising at least one suction cup.

In an embodiment, the displacement engagement section of the topmost bag is located between the second end of the stack and the separation section of the topmost bag, along the displacement axis "X".

According to another general aspect, there is also provided a method for repeatedly separating and displacing a topmost bag of a stack of bags along a displacement axis "X" extending between a first end and a second end of the stack. The stack has a second topmost bag located immediately under the topmost bag in the stack. The method comprises the steps of: seizing and lifting a separation section of the topmost bag located proximate to the first end of the stack; seizing and lifting a displacement engagement section of the topmost bag located between the second end of the stack and the separation section of the topmost bag along the displacement axis "X"; releasing the separation section of the topmost bag; and displacing the topmost bag along the displacement axis "X".

In an embodiment, the method further comprises the step of repeatedly adjusting a position of the stack of bags vertically to maintain a predetermined vertical distance between the topmost bag and a displacing manipulator displacing the topmost bag along the displacement axis "X".

In an embodiment, the method further comprises the step of holding a section of the second topmost bag to substantially prevent displacement thereof following the seizing and lifting of a separation section of the topmost bag located proximate to the first end of the stack.

In an embodiment, the step of displacing the topmost bag along the displacement axis "X" comprises displacing the topmost bag along the displacement axis "X" at a speed over about 0.25 m/s.

In an embodiment, the step of displacing the topmost bag along the displacement axis "X" comprises displacing the topmost bag along the displacement axis "X" at an acceleration of at least about 5.5 m/s².

In an embodiment, the step of displacing the topmost bag along the displacement axis "X" comprises displacing the topmost bag along the displacement axis "X" in a counter direction towards the first end of the stack and in a displacement direction, opposed to the counter direction, consecutively.

According to another general aspect there is further provided a method for repeatedly separating and displacing a topmost bag of a stack of bags along a displacement axis "X" extending between a first end and a second end of the stack. The stack also has a second topmost bag located immediately under the topmost bag in the stack. The bags of the stack have a separation section proximate to the first end of the stack. The method comprises the steps of: separating the separation section of the topmost bag from the separation section of the second topmost bag; and repeatedly carrying out the steps of: seizing and lifting a displacement engagement section of the topmost bag located between the second end of the stack and the separation section of the topmost bag along the displacement axis "X", using a displacing manipulator; displacing the topmost bag along the displacement axis "X" with the displacing manipulator; and adjusting a vertical position of at least one of the stack of bags and the displacing manipulator to maintain a predetermined vertical distance between the topmost bag of the stack and the displacing manipulator.

In an embodiment, the step of separating the separation section of the topmost bag from the separation section of the second topmost bag is carried out repeatedly. The step of separating the separation section of the topmost bag from the separation section of the second topmost bag is carried out prior to each repetition of the steps of seizing and lifting a displacement engagement section of the topmost bag and displacing the topmost bag along the displacement axis "X" with the displacing manipulator.

In an embodiment, the method further comprises the step of monitoring a vertical position of the topmost bag of the stack.

In an embodiment, the step of displacing the topmost bag along the displacement axis "X" comprises displacing the topmost bag along the displacement axis "X" at a speed over about 0.25 m/s.

In an embodiment, the step of displacing the topmost bag along the displacement axis "X" comprises displacing the topmost bag along the displacement axis "X" at an acceleration of at least about 5.5 m/s$^2$.

In an embodiment, the step of displacing the topmost bag along the displacement axis "X" comprises displacing the topmost bag along the displacement axis "X" in a counter direction towards the first end of the stack and in a displacement direction, opposed to the counter direction, consecutively.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which.

DETAILED DESCRIPTION

In the following description, the same numerical references refer to similar elements. The embodiments, geometrical configurations, materials mentioned and/or dimensions shown in the figures or described in the present description are embodiments only, given solely for exemplification purposes.

Moreover, although the embodiments of the improved apparatus for repeatedly separating and displacing a topmost bag from a stack of bags and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the improved apparatus for repeatedly separating and displacing a topmost bag from a stack of bags, as will be briefly explained herein and as can be easily inferred herefrom by a person skilled in the art. Moreover, it will be appreciated that positional descriptions such as "above", "below", "left", "right" and the like should, unless otherwise indicated, be taken in the context of the figures and should not be considered limiting.

Figure 1:
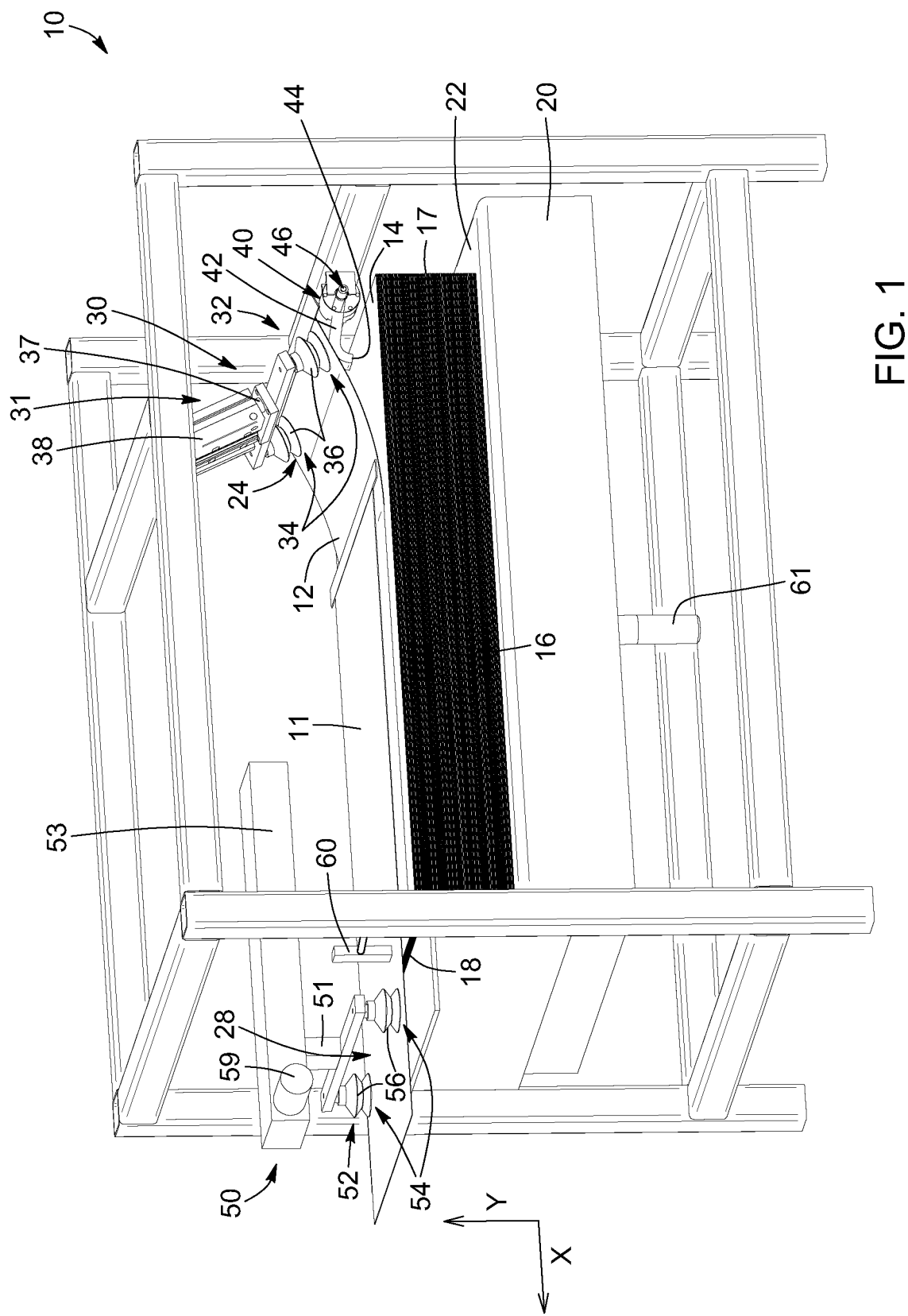
FIG. 1 is a perspective view of an apparatus for separating and displacing a topmost bag from a stack of bags, according to an embodiment, wherein a displaced bag is removed from the stack and shown in the second location, a separation section of a topmost bag is lifted from the stack and the second topmost bag is engaged by a holding manipulator.

Referring generally to FIG. 1, there is provided an apparatus 10 for repeatedly separating and displacing a topmost bag 12 from a stack of bags 16. The stack of bags 16 includes a plurality of empty bags stacked one over the other in a substantially horizontal orientation, with the topmost bag 12 being located at the top of the stack 16 and a second topmost bag 14 being located immediately under the topmost bag 12 in the stack 16. In FIG. 1, a displaced bag 11, i.e. a bag which has been previously displaced away from the stack 16 (and is consequently not part of the stack 16 anymore) is also shown. Each bag of the stack 16, including the topmost bag 12 and the second topmost bag 14, extend along a displacement axis "X" defined between a first end 17 and a second end 18 of the stack 16. The first end 17 and the second end 18 of the stack 16 are opposed ends thereof. In the illustrated embodiment, the displacement axis "X" extends along a longitudinal direction with regards to the stack 16, i.e. along a length thereof, with the first end 17 corresponding to the closed ends of the bags of the stack 16 (i.e. the bottom of the bags) and the second end corresponding to the open ends of the bags of the stack 16 (i.e. the top of the bags). One skilled in the art will easily understand that, in an alternative embodiment, the displacement axis "X" can however extend in a different direction, such as transversally (i.e. along a width thereof). Furthermore, in an alternative embodiment (not shown), the first end of the stack 17 can correspond to the open ends of the bags and the second end 18 of the stack can correspond to the closed ends of the bags.

In an embodiment, the stack of bags 16 is supported on a stacking surface 22 of a stacking table 20, which will be described in more details below. The bags of the stack 16 are supported on the stacking surface 22 at a bag stack location (which can also be referred to as the bag stack position), i.e. the location (or position) of the bags on the stacking surface 22 when they are superposed onto one another in the stack 16.

In the embodiment shown, the apparatus 10 includes a separating manipulator 30, a holding manipulator 40 (which could also be referred to as "retaining manipulator") and a displacing manipulator 50 cooperating with one another to perform the repetitive seizing and displacement of the topmost bag 12 from the stack of bags 16. For example and without being limitative, in an embodiment, the apparatus 10 operates to repeatedly seize the topmost bag 12 from the stack of bags 16 (at the bag stack location) and displace the topmost bag 12 towards a second location (or displaced location/position) (e.g. an opening location/position where the bag can be handled by an opening manipulator) distal from the bag stack location. In the second location, the bag can subsequently be manipulated by additional manipulator(s) (not shown), along a production line (not shown), for example to be opened, filled, sealed and evacuated from the production line.

In an alternative embodiment (not shown), the apparatus 10 can be free of holding manipulator. In such an embodiment, the apparatus 10 only includes a separating manipulator 30 cooperating with a displacing manipulator 50 for repeatedly seizing the topmost bag 12 at the bag stack location and displacing the topmost bag 12 towards the second location.

As will be better understood in view of the description below, the separating manipulator 30, the holding manipulator 40 and the displacing manipulator 50 operate in sequence to collaborate for the successive separation and displacement of the topmost bag 12 from the stack of bags 16. In an embodiment, the separating manipulator 30 initially captures the topmost bag 12 and separates it from the second topmost bag 14 of the stack 16, by lifting a section thereof, to expose a section of the second topmost bag 14. The holding manipulator 40 subsequently engages the exposed section of the second topmost bag 14 to substantially prevent displacement of the second topmost bag 14 along the displacement axis "X. The separating manipulator 30 releases the topmost bag 12 and the displacing manipulator 50 captures the topmost bag 12 and then displaces it along the displacement axis "X, towards the second location, as the second topmost bag 14 is maintained in place by the holding manipulator 40.

It is appreciated that several variations can be foreseen to the above-described sequence, provided that the topmost bag 12 has been lifted by the separating manipulator 30 from the stack of bags 16 when the holding manipulator 40 engages the exposed section of the second topmost bag 14 and that the separating manipulator 30 has released the topmost bag 12 when the displacing manipulator 50 displaces it along the displacement axis "X, towards the second location.

For instance and without being limitative, in alternative embodiments, the separating manipulator 30 and the displacing manipulator 50 can capture the topmost bag 12 simultaneously; the separating manipulator 30 can release the topmost bag 12 while the holding manipulator 40 engages the second topmost bag 14; the displacing manipulator 50 can capture the topmost bag 12 either before or after the separating manipulator 30 releases the topmost bag 12; and/or the displacing manipulator 50 can capture the topmost bag 12 prior to the topmost bag 12 being captured by the separating manipulator 30.

One skilled in the art will understand that, in the course of the present description, the term "having" with reference to the amount of degrees of freedom of a manipulator refers to the amount of degrees of freedom that the manipulator effectively has, while the term "using" refers to the amount of degrees of freedom that a manipulator effectively uses to perform its task, i.e. in an embodiment a manipulator can have more degrees of freedom than it actually uses to perform its tasks.

In the embodiment shown, the separating manipulator 30 is a single axis manipulator including a prehension end-effector 32 mounted to a lower end of a lifting arm 31, and using only one degree of freedom. The one degree of freedom allows a linear displacement of the prehension end-effector 32 by the lifting arm 31, between a bag engaging configuration and a lifted configuration, as will be described in more details below. In the embodiment shown, the lifting arm 31 is slightly angled towards the first end 17 of the stack 16, relative to the vertical axis "Y", but one skilled in the art will understand that, in alternative embodiments the lifting arm 31 can also be substantially vertical (extend substantially parallel to the vertical axis "Y") or be angled towards the second end 18 of the stack relative to the vertical axis "Y". For example and without being limitative, in an embodiment, the one degree of freedom used by the lifting arm 31 can be provided by a linear actuator such as a pneumatic cylinder, a hydraulic cylinder, an electric cylinder or the like, where a displaceable link 37 is moved linearly relative to a fixed link 38. One skilled in the art will understand that, in alternative embodiments (not shown), several alternate manipulator configurations, robot types and/or robot configurations, which allow engagement and lifting of the topmost bag 12 to separate it from the other bags of the stack 16, from above, could also be used for the separating manipulator 30, rather than the linearly translatable lifting arm 31 of the embodiment shown. Moreover, in an alternative embodiment, the lifting arm 31 can have more than the two links of the embodiment shown. Therefore, in an embodiment, the separating manipulator 30 can therefore use and/or have more than the one degree of freedom of the illustrated embodiment.

In an alternative embodiment (not shown), the separating manipulator 30 can also be a rotatable separator engageable with at least one bag of the stack 16 and configurable to separate a section of the topmost bag 12 from a section of the second topmost bag 14.

In the embodiment shown, the prehension end-effector 32 of the separating manipulator 30 includes a prehension device which is designed to interact and, more particularly, seize, grasp or pick the topmost bag 12 from the stack of bags 16, maintain the topmost bag 12 as the topmost bag 12 is lifted from the stack 16 and subsequently release the topmost bag 12. The prehension end-effector 32 engages a separation section 24 of the topmost bag 12 which is located proximate to the first end 17 of the stack 16. As mentioned above, in the embodiment shown, the first end 17 of the stack 16 is the closed end of the topmost bag 12, farthest from the second location of the bag along the "X" axis.

In the embodiment shown, the prehension device of the prehension end-effector 32 is a vacuum gripper 34 with spaced-apart suction cups 36 activable to capture and temporarily maintain the topmost bag 12, by an upper face thereof. In the non-limitative embodiment shown, the vacuum gripper 34 has two suction cups 36 positioned to engage the topmost bag 12 proximate to opposite lateral edges thereof, along the separation section 24 thereof. One skilled in the art will understand that, in an alternative embodiment (not shown), the vacuum gripper 34 can however be different from the embodiment shown. For example and without being limitative, the vacuum gripper 34 can have a different number of suction cups 36 and/or suction cups 36 configured according to a different configuration, to provide the sufficient negative pressure to generate the required suction force to capture and temporarily maintain the topmost bag 12 in contact therewith, without capturing simultaneously the second topmost bag 14. In an embodiment, and as will be described in more details below, the vacuum gripper 34 is activated for seizing the topmost bag 12 from the stack 16 and temporarily maintaining the topmost bag 12 as it is lifted from the stack 16. The vacuum gripper 34 is subsequently deactivated in order to release the topmost bag 12 onto the stack 16. It will be understood that, in alternative embodiments, other prehension devices can also be used to generate the desired prehension and retention force, such as, without being limitative, a mechanical gripper or the like.

In an embodiment, the holding manipulator 40 is also a single axis manipulator using only one degree of freedom. In an embodiment, the holding manipulator 40 includes two spaced-apart pivotable stack engaging arms 42 (only one is shown) having a proximal end secured to a pivoting shaft 46 and pivoting therewith between a bag holding configuration (see FIGS. 1 and 6 to 8) and a disengaged configuration (See FIGS. 2 to 5). The one degree of freedom allows pivoting of the stack engaging arms 42, to engage an upper surface of the second topmost bag 14, from above when configured in the engaging configuration. The pivoting shaft 46 pivots about a pivoting axis extending perpendicularly to the "X" and "Y" axes. In the embodiment shown, the pivotable stack engaging arms 42 have a curved profile, with a stack engaging end 44, spaced-apart from the proximal end, being curved downwardly towards the upper surface of the second topmost bag 14. One skilled in the art will however understand that, in alternative embodiments (not shown), the stack engaging arms 42 can have a profile different than the embodiment shown, such as, for example and without being limitative, a substantially straight profile, a rectilinear profile or the like. Furthermore, the holding manipulator 40 can include one or more pivotable stack engaging arms 42.

As can be seen in FIG. 1 and as will be described in more details below, in the engaging configuration, the holding manipulator 40 engages the upper surface of the second topmost bag 14, which becomes exposed as a result of the lifting of the separation section 24 of the topmost bag 12 by the separating manipulator 30. Indeed, the stack engaging arms 42 can be pivoted towards and away from the upper surface of the second topmost bag 14 by the pivoting shaft 46. Hence, the stack engaging arms 42 are pivoted towards the upper surface of the second topmost bag 14 following the lifting of the separation section 24 of the topmost bag 12 by the separating manipulator 30. In an embodiment, the stack engaging arms 42 are sized and shaped not to knock down the lifted topmost bag 12, as the stack engaging arms 42 are pivoted downwardly to engage the upper surface of the second topmost bag 14 of the stack 16.

In an embodiment, the stack engaging arms 42 are sized and shaped such that they brush against the lifted topmost bag 12 while pivoting to engage the second topmost bag 14. Hence, in a case where two consecutive bags are inadvertently seized and lifted simultaneously by the separating manipulator 30 (i.e. the topmost bag 12 and the second topmost bag 14), the contact between the lifted bags and the stack engaging arms 42, while configuring same in the bag holding configuration, can release the second topmost bag 14 from the topmost bag 12.

In an embodiment (not shown), the stack engaging arms 42 can include an extension member (not shown) protruding therefrom and towards the second end 18 of the stack 16 when the stack engaging arms 42 are configured in the bag holding configuration. The extension member is configured to achieve the desired brushing (i.e. light contact) of the lifted topmost bag 12 during the change in configuration between the disengaged configuration and the bag holding configuration. In an embodiment, the extension member can be a flexible member.

One skilled in the art will understand that, in alternative embodiments, several different manipulator configurations, robot types and/or robot configurations, which allow engagement of the upper surface of the second topmost bag 14, from above, subsequently to the lifting of the separation section 24 of the topmost bag 12 being performed by the separating manipulator 30, can also be used for the holding manipulator 40. For example and without being limitative, in an alternative embodiment (not shown), the stack engaging arms 42 can be a multiple link arm. Moreover, the holding manipulator 40 can use and/or have more than the one degree of freedom of the illustrated embodiment, for example through multiple linear movements, rotational/pivotal movements or a combination thereof.

In the embodiment shown, the holding manipulator 40 does not include any prehension end-effector interacting with the second topmost bag 14 of the stack 16. Indeed, in the embodiment shown, the stack engaging ends 44 of the stack engaging arms 42 abut a separation section 24 of the second topmost bag 14, which is located proximate to the first end 17 of the stack 16 (i.e. closed to the closed end of the second topmost bag 14 or farthest from the second location of the bag along the "X" axis, in the embodiment shown). The stack engaging arms 42 apply a sufficient downward pressure on the second topmost bag 14 to substantially prevent displacement thereof, by friction. One skilled in the art will however understand that, in alternative embodiments (not shown), the holding manipulator 40 can include a prehension device, such as a vacuum gripper with suction cups, a mechanical gripper or the like, operative to temporarily maintain the second topmost bag 14 on the stack 16.

In the embodiment shown, the displacing manipulator 50 is a two-axis Cartesian manipulator, using two degrees of freedom, which includes a prehension end-effector 52 mounted at a lower end of a Y-axis support 51 operatively connected to an X-axis support 53. In the course of the present description, when a topmost bag 12 is engaged by the displacing manipulator 50 and sufficiently moved away from the stack 16, it stops being referred to as the topmost bag 12 and is now referred to as the displaced bag 11. For example, in FIG. 1, the prehension end-effector 52 of the displacing manipulator 50 is shown engaging a displacement engagement section 28 of a bag that has been substantially displaced and is now referred to as the displaced bag 11 rather than the topmost bag 12.

In the embodiment shown, the Y-axis support 51 extends substantially vertically (i.e. extends substantially parallel to the vertical axis "Y") and the X-axis support 53 extends substantially horizontally (i.e. extends substantially parallel to the displacement axis "X"). One skilled in the art will understand that, in an alternative embodiment (not shown), the Y-axis support 51 can however be angled relative to the vertical axis "Y", the displacing manipulator 50 thereby departing from a Cartesian manipulator in such a case.

The two degrees of freedom of the displacing manipulator 50 allows linear displacements of the prehension end-effector 32, vertically (i.e. relative to a vertical axis "Y"), and horizontally (i.e. relative to the displacement axis "X"). For example and without being limitative, in an embodiment, the first degree of freedom of the displacing manipulator 50 is provided by a linear actuator (not shown), such as a pneumatic cylinder, a hydraulic cylinder, an electric cylinder or the like, to displace a vertically movable section (not shown) of the Y-axis support 51 linearly relative to the vertical axis "Y". In an embodiment, the second degree of freedom is provided by another linear actuator (not shown), such as a pneumatic cylinder, a hydraulic cylinder, an electric cylinder or the like, to displace the Y-axis support 51 linearly along the X-axis support 53. In an alternative embodiment, the Y-axis support 51 can be fixedly mounted to the X-axis support 53, and the X-axis support 53 can be translated linearly, translating simultaneously the Y-axis support 51 along the displacement axis "X". In an embodiment, the second degree of freedom is provided by a servomotor 59, to perform the required rapid and precise displacement relative to the displacement axis "X", as will be described in more details below.

One skilled in the art will understand that, in alternative embodiments (not shown), several manipulator types and/or configurations different from the Cartesian manipulator of the embodiment shown and which allow the engagement and displacement of the topmost bag 12 of the stack 16, from above, could also be used. Moreover, in another alternative embodiment (not shown), the displacing manipulator 50 can have more links than the Y-axis support 51 and the X-axis support 53 of the embodiment shown and can use and/or have more than the two degrees of freedom of the embodiment shown.

In the embodiment shown, the prehension end-effector 52 of the displacing manipulator 50 includes a prehension device which is designed to interact and, more particularly, seize, grasp or pick the topmost bag 12 from the stack of bags 16, maintain the topmost bag 12 as the topmost bag 12 is displaced (and is now referred to as the displaced bag 11) and subsequently release the displaced bag 11. The prehension end-effector 52 engages a displacement engagement section 28 of the topmost bag 12, which is located between the second end 18 of the stack 16 and the separation section 24 of the topmost bag 12, along the displacement axis "X".

In the embodiment shown, the prehension device of the prehension end-effector 52 is a vacuum gripper 54 with suction cups 56 activable to capture and temporarily maintain the topmost bag 12, by an upper face thereof. In the non-limitative embodiment shown, the vacuum gripper 54 has two suction cups 56 positioned to engage the topmost bag 12 proximate to opposite lateral edges thereof, along the displacement engagement section 28 thereof. One skilled in the art will understand that, in an alternative embodiment (not shown), the vacuum gripper 54 can be different than the embodiment shown. For example and without being limitative, in an embodiment (not shown), the vacuum gripper 54 can have a different number of suction cups 56 and/or suction cups 56 configured according to a different configuration, to provide the sufficient negative pressure to generate the required suction force to capture and temporarily maintain the displacement engagement section 28 of topmost bag 12 (or displaced bag 11) in contact therewith. In an embodiment, and as will be described in more details below, the vacuum gripper 34 is activated for seizing the topmost bag 12 from the stack 16, temporarily maintaining the topmost bag 12 as the topmost bag 12 is displaced along the displacement axis "X" (and is now referred to as the displaced bag 11) and is subsequently deactivated in order to release the displaced bag 11. It will be understood that, once again, in alternative embodiments (not shown), other prehension devices can be used to generate the desired prehension and retention force, such as, without being limitative, a mechanical gripper or the like.

In an embodiment, the displacement of the topmost bag 12 along the displacement axis "X" and the location and configuration of the displaced bag 11 in the second location is precisely controlled. In some implementations, the position of the displaced bag 11 at the second location is controlled to ensure that the bag is properly transferred to a subsequent manipulator, such as and without being limitative, a bag opening manipulator. In an embodiment, the apparatus 10 can include a bag location sensor (not shown), proximate to the predetermined second location, to detect the position and/or configuration of the bag at the second location. The bag location sensor can be operatively connected to a bag location controller (not shown) and/or to the displacing manipulator 50 to control the displacement thereof along the displacement axis "X" and ensure that the displaced bag 11 reaches substantially the predetermined second location.

In an embodiment, the apparatus 10 further comprises a stack level detector 60, operative to detect the vertical position of the topmost bag 12 of the stack of bags 16. The stack level detector 60 is operatively connected to a stacking table displacement assembly 61, which repeatedly adjusts the vertical position of the stacking table 20 according to the vertical position of the topmost bag 12 detected by the stack level detector 60. For example and without being limitative, in an embodiment, the stack level detector 60 is a sensor, such as a proximity sensor, sensing whether the topmost bag 12 of the stack of bags 16 is vertically located within a defined distance of the sensor, for example through the detection of the vertical position of a section of the topmost bag 12. When the sensor senses that the topmost bag 12 is vertically located further away than the defined distance, the sensor communicates with the stacking table displacement assembly 61, which moves the stacking table 20 upwardly until the stack level detector 60 senses that the topmost bag 12 is vertically located within the defined distance. It is appreciated that the stack level detector 60 and the stacking table displacement assembly 61 can be operatively connected to another and in data communication through a stacking table controller (not shown). The stacking table controller receives data indicating the vertical position of a section of the topmost bag 12 from the stack level detector 60, calculating the required vertical displacement of the stacking table, and transmitting displacement instructions to the stacking table displacement assembly 61. It is appreciated that other sensors than a proximity sensor can be used as stack level detector 60, such as and without being limitative, a photocell, a laser, or the like.

In an embodiment, the separating manipulator 30, the holding manipulator 40, and the displacing manipulator 50 can be operatively connected to a manipulator controller (not shown) which synchronizes the respective operation thereof. Furthermore, in an embodiment, the manipulator controller can be operatively connected to the stack level detector 60 and the stacking table displacement assembly (or to the stacking table controller) to synchronize the operation of these components, alone or in combination with the operation of the separating manipulator 30, the holding manipulator 40, and the displacing manipulator 50. It is appreciated that the manipulator controller and the stacking table controller can be embedded in a single controller.

It is appreciated that, in an alternative embodiment of the apparatus 10 (not shown), the stacking table 20 can be stationary and the separating manipulator 30, the holding manipulator 40 (if any) and/or the displacing manipulator 50 can be vertically displaceable, such that a distance between the manipulators 30, 40 (if any), 50 and the topmost bag 12 remains substantially constant. In such an embodiment (not shown), the apparatus 10 can include the stack level detector 60 operatively connected to a manipulator displacement assembly (not shown) and, optionally, to a controller. In still another embodiment (not shown), the stacking table 20 and the manipulators 30, 40 (if any), 50 can both be vertically translatable and adjustable to control a vertical distance between the topmost bag 12 and the manipulators 30, 40 (if any), 50.

As mentioned above, in an alternative embodiment (not shown), the apparatus 10 can also be free of holding manipulator 40. Furthermore, the shape and the configuration of the manipulators 30, 40 (if any), 50 can vary from the embodiments shown in the accompanying figures and described above. For example, in an alternative embodiment (not shown), the separating manipulator 30 can be embodied by an assembly that rolls the first end 17 of the stack 16 to separate the piled bags from one another. In such an embodiment, not shown (not shown), the displacing manipulator 50 can engage and lift the separation section 24 of the topmost bag 12, slightly away from the stack 16, and then displace the topmost bag 12 (which is then referred to as the displaced bag 11) into the second location.

Now referring to FIGS. 2 to 8, an embodiment of a sequence of operation of the apparatus 10 for repeatedly separating and displacing a topmost bag 12 from a stack of bags 16 will now be described.

Figure 2:
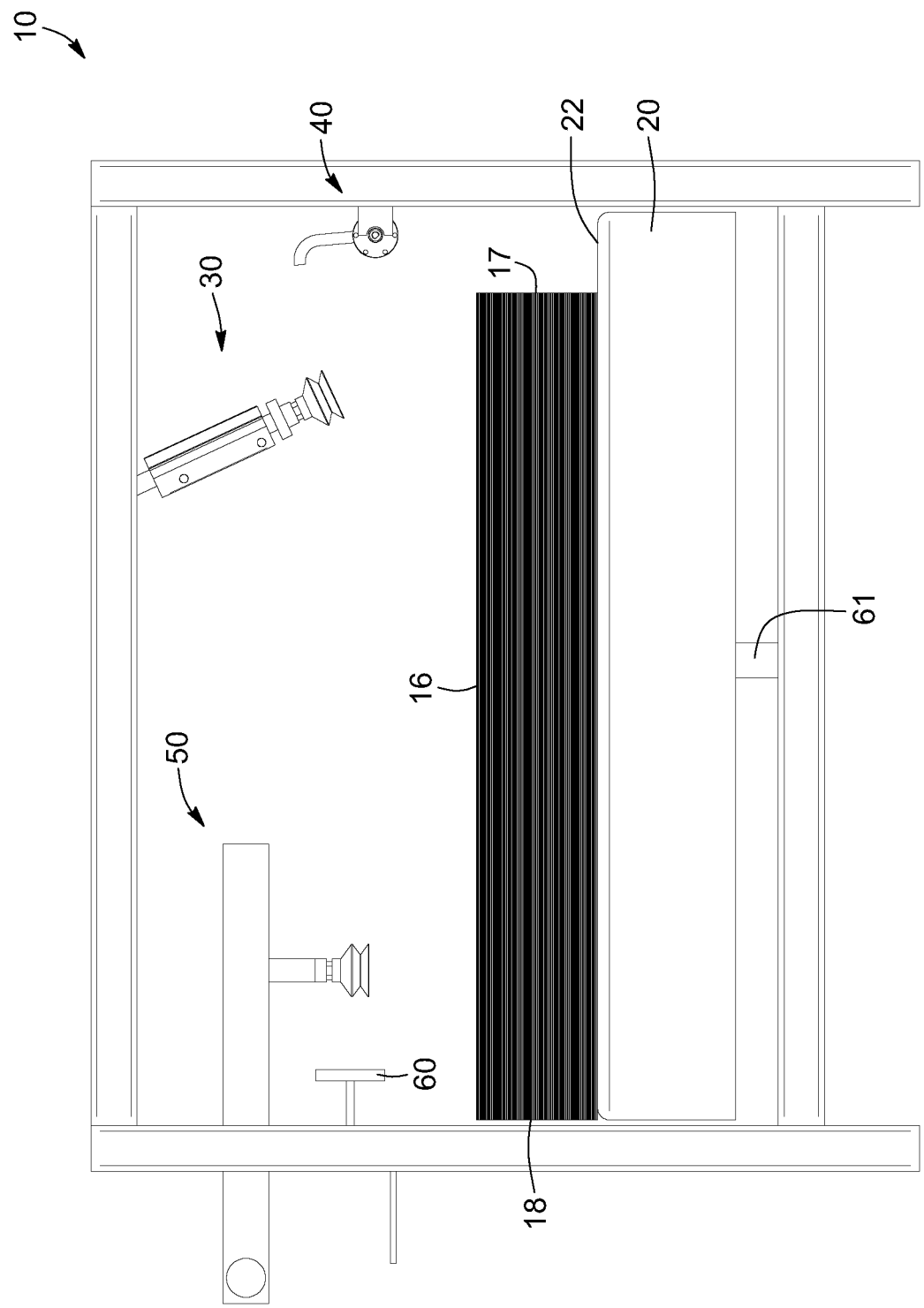
FIG. 2 is a schematic side elevation representation of the apparatus of FIG. 1, wherein the stacking table shown in a lowered configuration.

FIG. 2 shows an initial configuration, where the stack of bags 16 is placed on the stacking table 20, in a lowered configuration. In this lowered configuration, the stacking table 20 is positioned such that the stack 16 is vertically lower than the required vertical position for the separating manipulator 30, the holding manipulator 40, and the displacing manipulator 50 to interact with the topmost bag 12 and the second topmost bag 14. Such a configuration is commonly reached when providing new bags on a depleted stack 16 or directly onto an empty stacking table 20.

Figure 3:
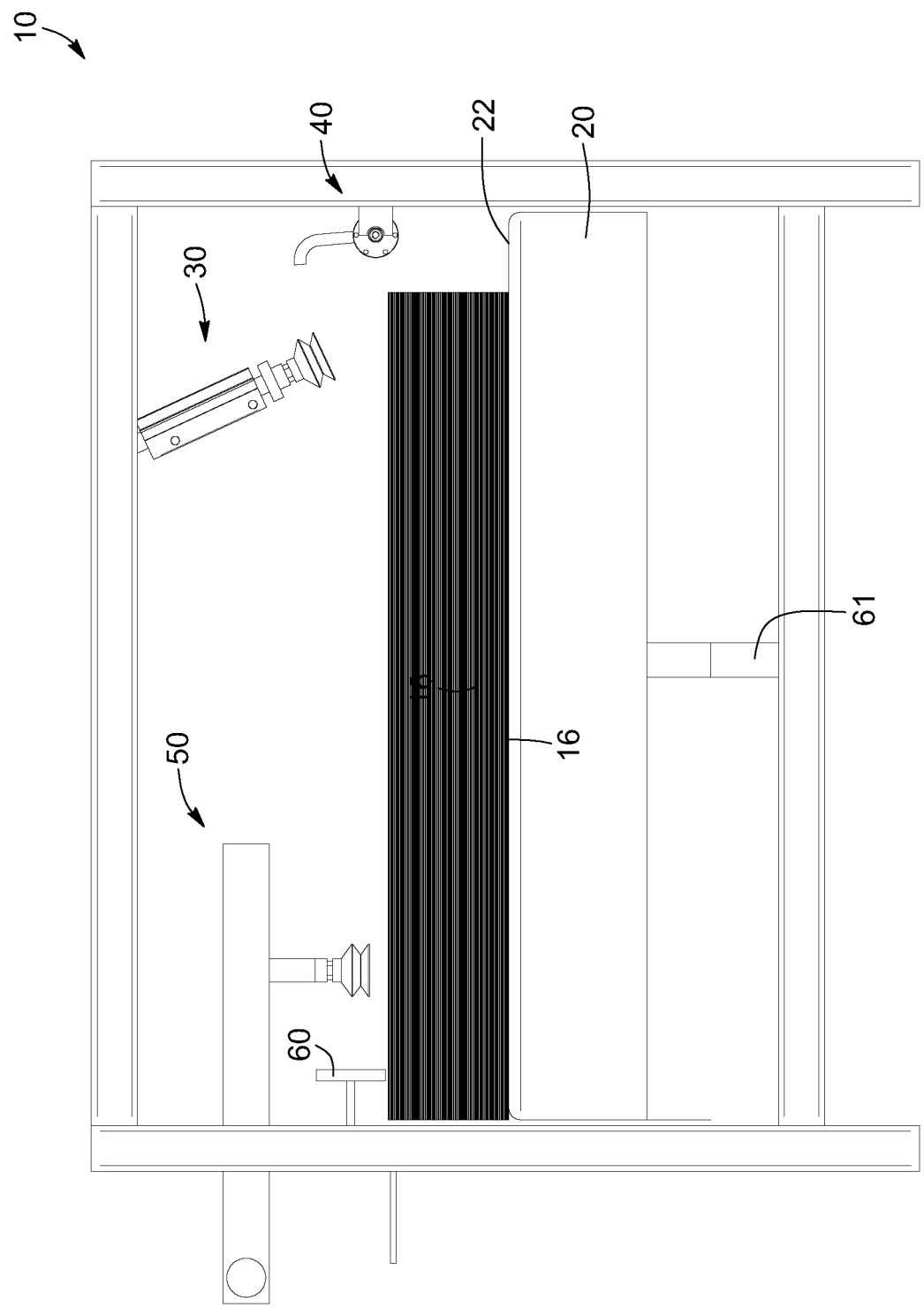
FIG. 3 is a schematic side elevation representation of the apparatus of FIG. 1, wherein the stacking table is shown in a bag removal configuration.

FIG. 3 shows the stacking table 20 being moved upwards, such that the stack 16 is now positioned in a bag removal (raised) configuration, where the topmost bag 12 and the second topmost bag 14 are vertically located at the required vertical position for the separating manipulator 30, the holding manipulator 40 (if any), and the displacing manipulator 50 to interact therewith. As described above, in an embodiment, the vertical position of the stacking table 20 is adjusted using a combination of the stack level detector 60 and the stacking table displacement assembly 61, which respectively detects the vertical position of the topmost bag 12 of the stack of bags 16 and vertically adjusts the position of the stacking table 20. In an embodiment, as described in detailed above, the vertical position of the stack 16 is repeatedly adjusted to maintain the topmost bag 12 of the stack 16 at a substantially constant vertical level during operation of the apparatus 10, even as the stack 16 is depleted and its height consequently reduces gradually. In an alternative embodiment (not shown), movement between the stacking table 20 and the manipulators 30, 40 (if any), 50 can also be provided to maintain the topmost bag 12 of the stack 16 at a substantially constant vertical level, with respect to the manipulators 30, 40 (if any), 50, during operation of the apparatus 10.

Figure 4:
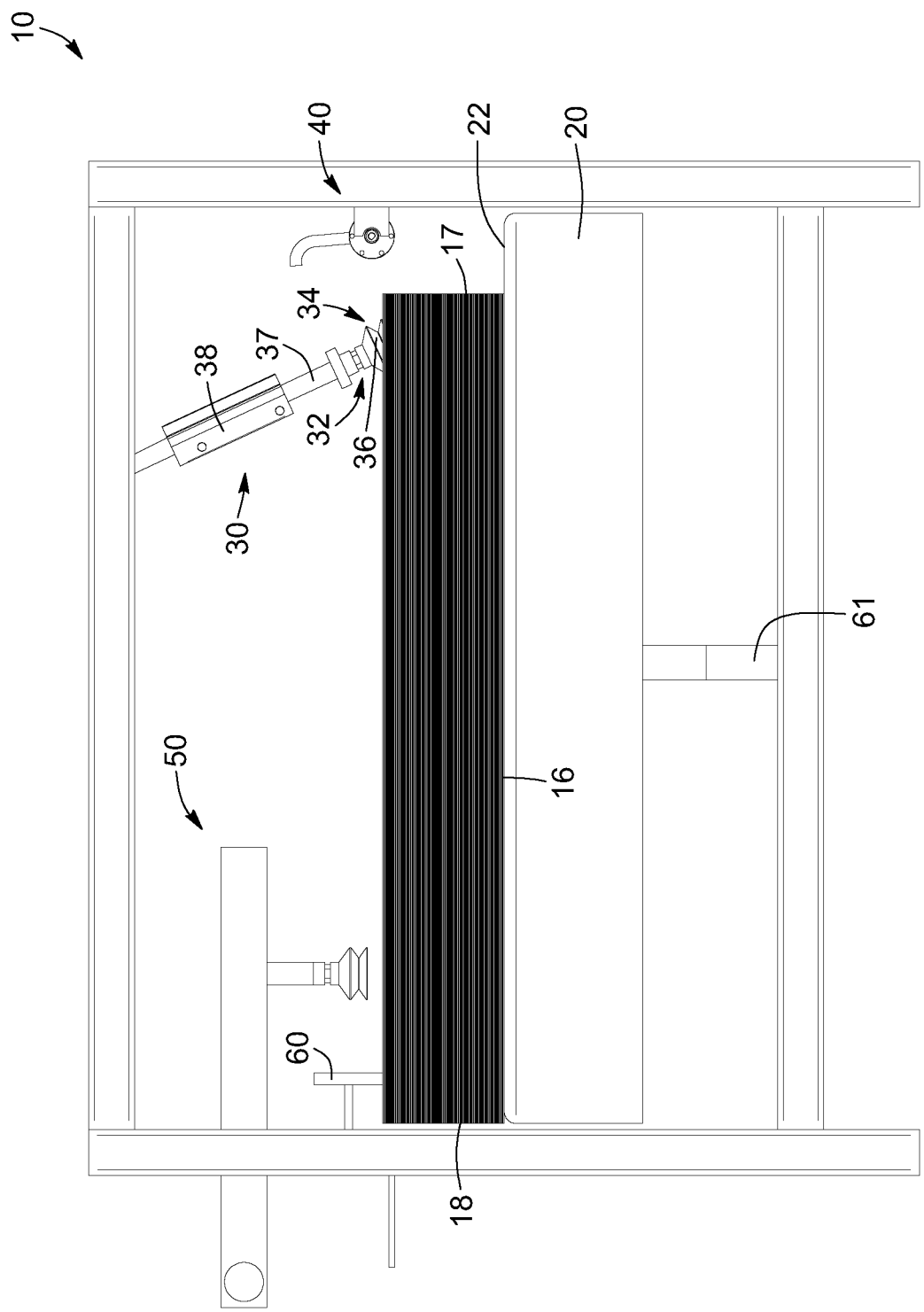
FIG. 4 is a schematic side elevation representation of the apparatus of FIG. 1, wherein the topmost bag is seized by the separating manipulator.
Figure 5:
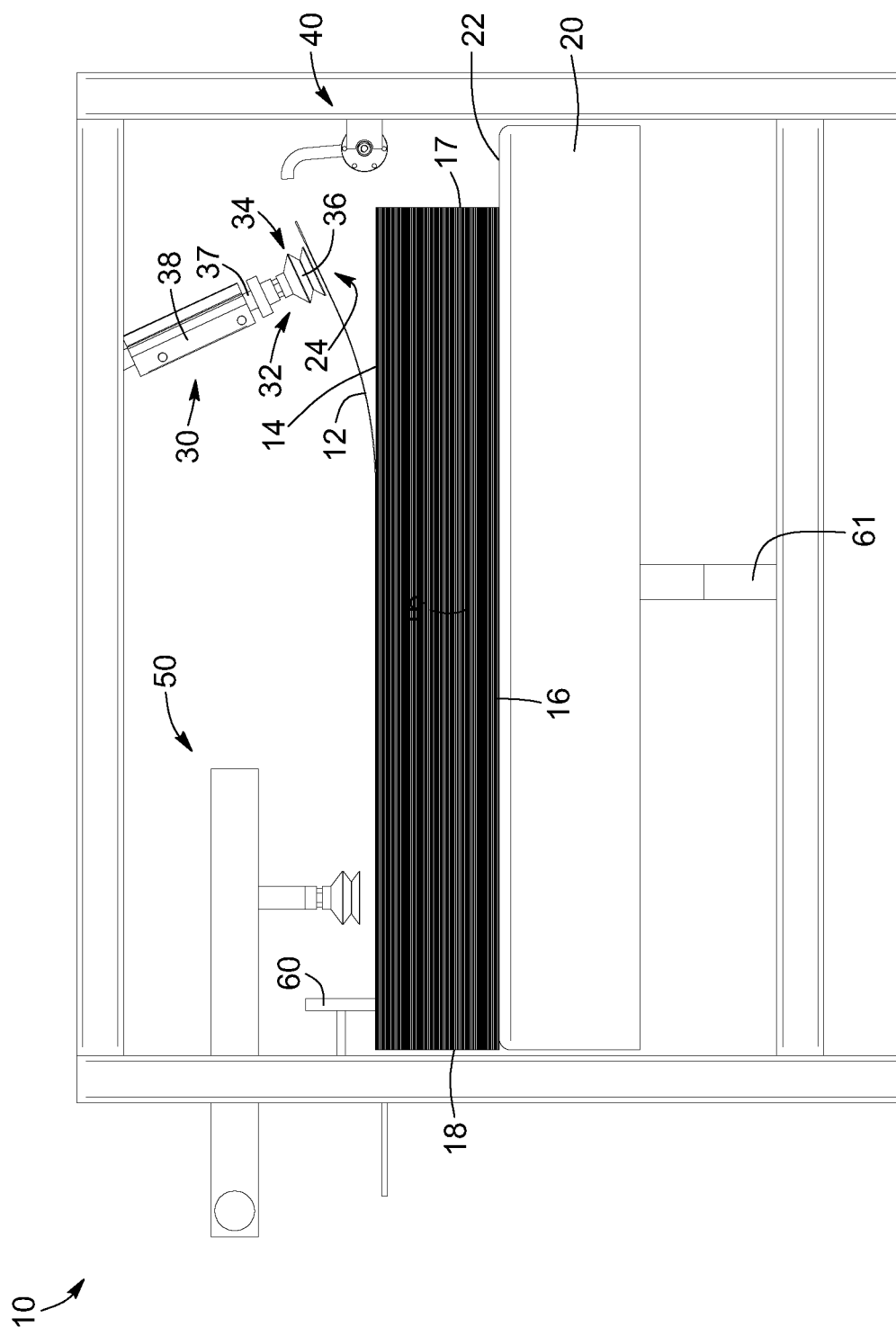
FIG. 5 is a schematic side elevation representation of the apparatus of FIG. 1, wherein the separation section of the topmost bag is lifted by the separating manipulator.

FIGS. 4 and 5 show the topmost bag 12 being captured and subsequently lifted by the separating manipulator 30. As mentioned above, in the embodiment shown, the seizing and lifting of the topmost bag 12 is performed using the prehension end-effector 32 of the separating manipulator 30, including the vacuum gripper 34, mounted to the lower end of the lifting arm 31. Hence, the prehension end-effector 32 is firstly lowered (extended) towards the upper surface of the topmost bag 12 of the stack 16, in a bag engaging configuration, for engagement therewith, and the vacuum gripper 34 is activated for capturing the topmost bag 12 from the stack 16 (See FIG. 4). Subsequently, the prehension end-effector 32 is lifted upwardly away from the stack 16, in a lifted configuration, by the lifting arm 31, which is contracted, as the topmost bag 12 is maintained thereon. Such lifting thereby results in the separation section 24 of the topmost bag 12 being lifted away from the stack 16 (See FIG. 5), the topmost bag 12 being at least partially separated from the remaining bags of the stack 16, and a section of the second topmost bag 14 being exposed (See FIG. 5).

Figure 6:
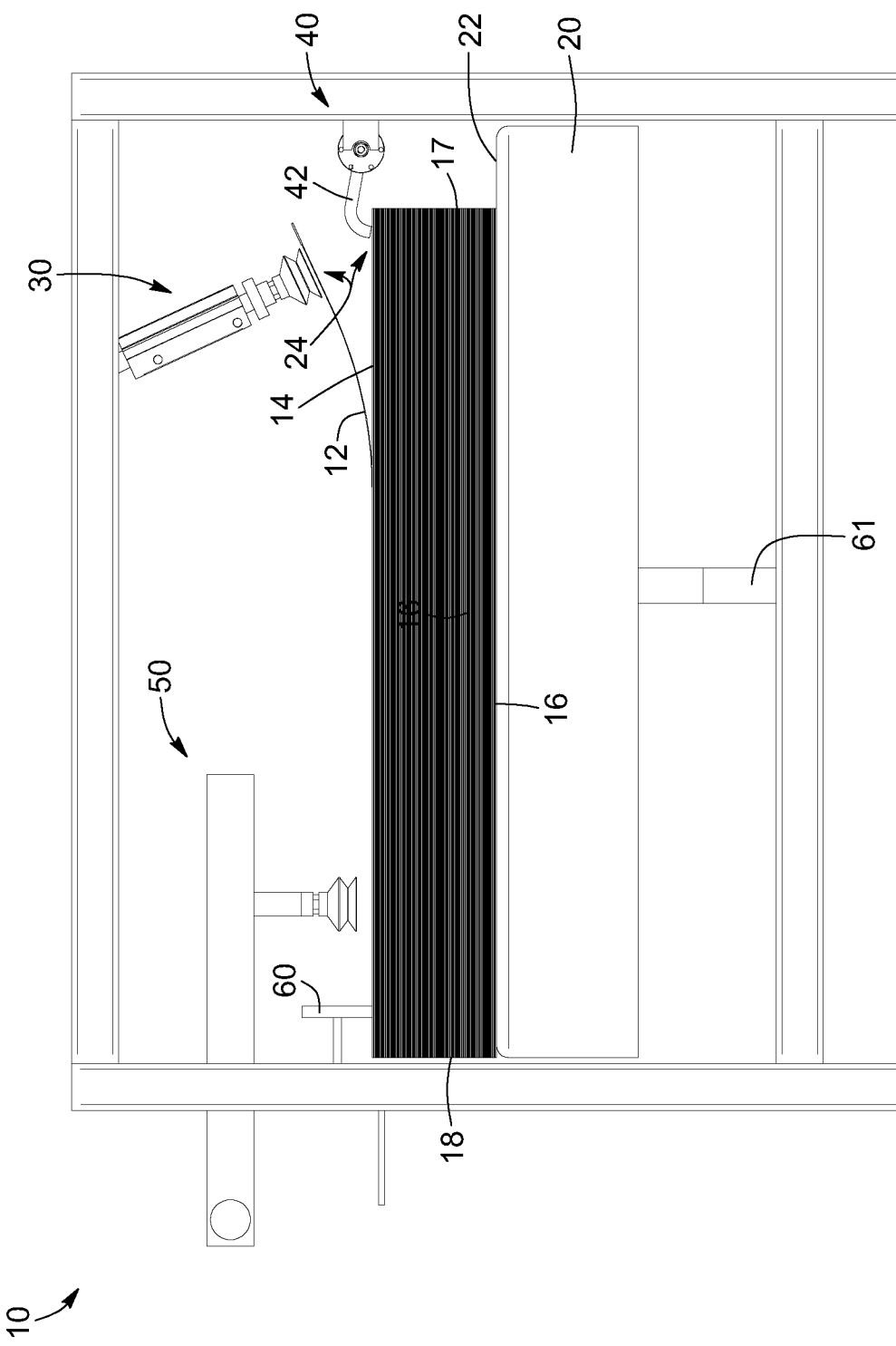
FIG. 6 is a schematic side elevation representation of the apparatus of FIG. 1, wherein the second topmost bag is engaged by the holding manipulator.

FIG. 6 shows the holding manipulator 40 engaging the upper surface of the second topmost bag 14 (which is now exposed as a result of the lifting of the separation section 24 of the topmost bag 12 by the separating manipulator 30) in order to maintain the second topmost bag 14 and prevent displacement thereof along the displacement axis "X". In the embodiment shown, the engagement of the second topmost bag 14 by the holding manipulator 40 is performed by the pivoting of the stack engaging arms 42 of the holding manipulator 40 from the disengaged configuration to the bag holding configuration, wherein the stack engaging ends 44 of the stack engaging arms 42 engage the separation section 24 of the second topmost bag 14. In the bag holding configuration, the stack engaging ends 44 of the stack engaging arms 42 abut and apply pressure on the separation section 24 of the second topmost bag 14. As mentioned above, in the embodiment shown, the stack engaging arms 42 apply a sufficient downward pressure on the second topmost bag 14 to substantially prevent displacement thereof along the displacement axis "X", by friction, especially while the topmost bag 12 is displaced along the displacement axis "X" by the displacing manipulator 50, as will be described in more details below.

Figure 7:
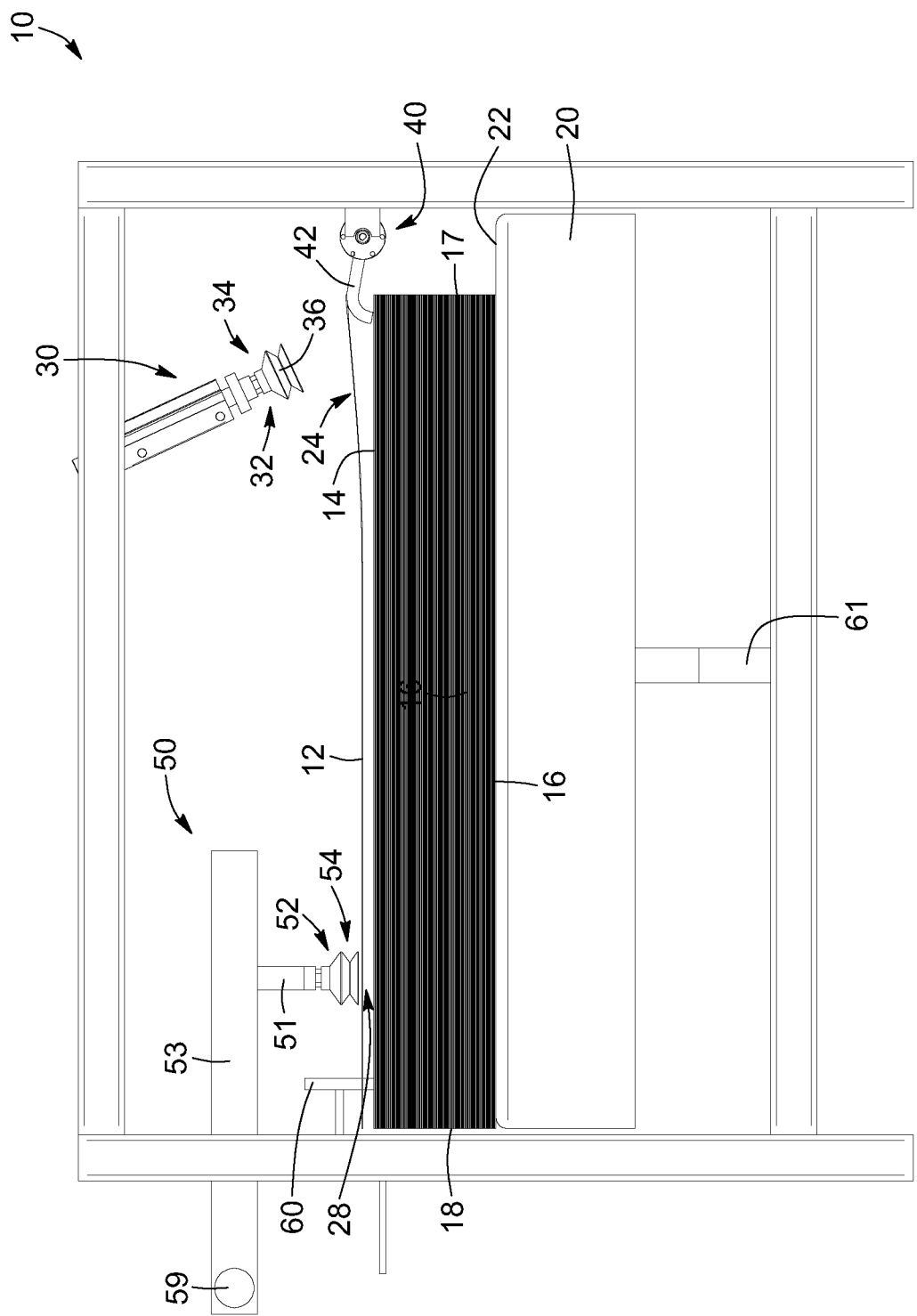
FIG. 7 is a schematic side elevation representation of the apparatus of FIG. 1, wherein the topmost bag is lifted by the displacing manipulator and released by the separating manipulator.

FIG. 7 shows the topmost bag 12 being captured by the displacing manipulator 50, along the displacement engagement section 28 and being released by the separating manipulator 30 at the separation section. In the embodiment shown, the topmost bag 12 is released by the separating manipulator 30 simultaneously as the displacing manipulator 50 captures the displacement engagement section 28 of the topmost bag 12. As mentioned above, it is appreciated that these steps can be carried out in a different order. The displacing manipulator 50 can capture the displacement engagement section 28 of the topmost bag 12 either before, simultaneously or after the separation section 24 is engaged by the separating manipulator 30. Similarly, the separating manipulator 30 can release the separation section 24 of the topmost bag 12 either before, simultaneously or after the displacement engagement section 28 of the topmost bag 12 is engaged by the displacing manipulator 50. Of course, it will be understood that the release of the separation section 24 of the topmost bag 12 by the separating manipulator 30 is required to occur before the displacing manipulator 50 displaces the topmost bag 12 along the displacement axis "X".

In the embodiment shown, the release of the topmost bag 12 by the separating manipulator 30 is performed by the vacuum gripper 34 of the prehension end effector 32 of the separating manipulator 30 being deactivated in order to release the topmost bag 12 therefrom.

As mentioned above, in the embodiment shown, the seizing and lifting of the displacement engagement section 28 of the topmost bag 12 is performed using the prehension end-effector 52, including the vacuum gripper 54, mounted at the lower end of the Y-axis support 51 of the displacing manipulator 50. Hence, the prehension end-effector 52 is firstly lowered towards the displacement engagement section 28 of the topmost bag 12 of the stack 16, for engagement, and the vacuum gripper 54 is activated for capturing the topmost bag 12 from the stack 16. Subsequently, the prehension end-effector 52 is lifted upwardly away from the stack 16, by the Y-axis support 51, as the topmost bag 12 is maintained thereon. It should be noted that, in an embodiment, the displacement engagement section 28 is lifted away from the stack 16 only slightly, i.e. only of a distance required to separate the displacement engagement section 28 of the topmost bag 12 from the second topmost bag 14 and/or to reduce friction therebetween during displacement.

Hence, in an embodiment, the displacement engagement section 28 is lifted away from the stack 16 of a distance shorter than the separation section 24 was previously lifted away from the stack 16. In other words, the lifting arm 31 of the separating manipulator 30 has a separating manipulator lifting stroke length (corresponding to the distance travelled by the prehension end-effector 32 between the bag engaging configuration and the lifted configuration of the separating manipulator 30 and the consequent distance the separation section 24 is lifted away from the stack) greater than the separating manipulator lifting stroke length of the Y-axis support 51 of the displacing manipulator 50 (corresponding to the distance travelled by the prehension end-effector 52 between the capture and the lifting of the topmost bag 12 and the consequent distance the displacement engagement section 28 is lifted away from the stack 16). In an embodiment, the lifting distance of the displacement engagement section 28 of the topmost bag 12 is predetermined and intended to prevent opening or distortion of the topmost bag 12 while it is lifted by the displacing manipulator 50.

In an embodiment (not shown), following the lifting of the displacement engagement section 28, some sections of the topmost bag 12 are typically still in contact with the second topmost bag 14 of the stack 16. However, in some implementations, especially for porous bags (See FIG. 7), the topmost bag 12 and the second topmost bag 14 of the stack 16 can be entirely separated.

In a non-limitative embodiment, as mentioned above, the capture of the topmost bag 12 by the displacing manipulator 50 and the release of the topmost bag 12 by the separating manipulator 30 are performed substantially simultaneously. One skilled in the art will however understand that, in alternative embodiments, the capture of the topmost bag 12 by the displacing manipulator 50 and the release of the topmost bag 12 by the separating manipulator 30 can be performed sequentially with either one of the steps being performed prior to the other, as detailed above.

Figure 8:
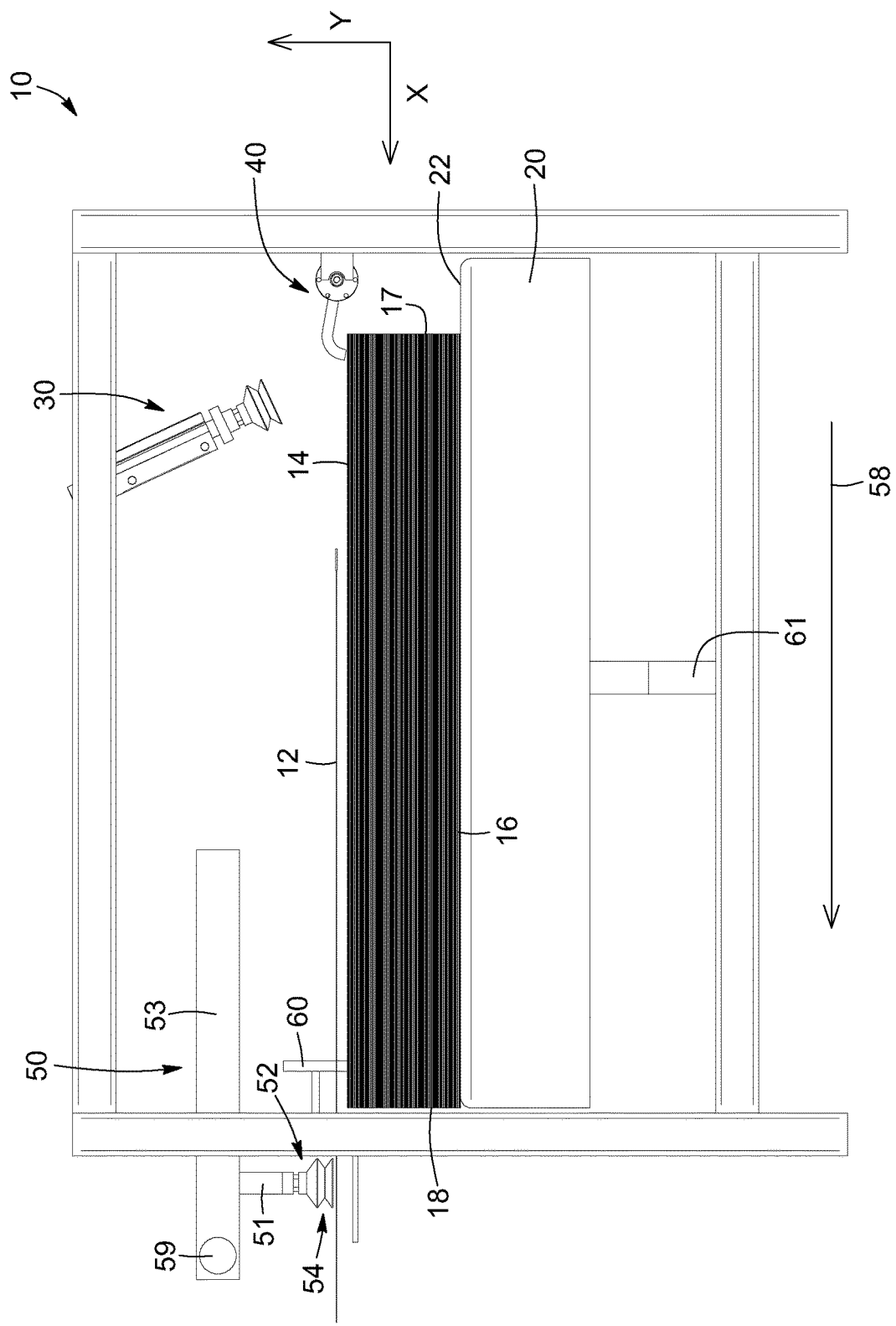
FIG. 8 is a schematic side elevation representation of the apparatus of FIG. 1, wherein the topmost bag is displaced by the displacing manipulator.

FIG. 8 shows the topmost bag 12 (which can also be referred to as the displaced bag at this point) being displaced along the displacement axis "X" in the displacement direction 58, towards a second location, spaced-apart from the bag stack location, for subsequent removal from the stack 16. In order to reach the second location, the topmost bag 12 is displaced along the displacement axis "X" by the displacing manipulator 50. In the embodiment shown, the displacement is performed by displacing the Y-axis support 51 of the displacing manipulator 50 linearly along the X-axis support 53, while the displacement engagement section 28 of the topmost bag 12 is maintained against the prehension end effector 52 of the displacing manipulator 50. At the same time, the holding manipulator 40 remains engaged with the separation section 24 of the second topmost bag 14 to substantially prevent displacement thereof along the displacement axis "X".

The combination of the displacement of the topmost bag 12 along the displacement axis "X" and the maintaining of the second topmost bag 14 by the holding manipulator 40 helps to ensure that the topmost bag 12 is separated from the second topmost bag 14 when the displacement occurs. In order to further help separating the topmost bag 12 from the second topmost bag 14, in an embodiment, the displacing manipulator 50 displaces the topmost bag 12 along the displacement axis "X" at a speed and/or with an acceleration which is sufficiently fast to trigger a separation therebetween. For example, in an embodiment, the displacing manipulator 50 displaces the topmost bag 12 along the displacement axis "X" at a speed over about 0.25 m/s with an acceleration of at least about 5.5 m/s$^2$. In an alternative embodiment, the displacing manipulator 50 displaces the topmost bag 12 along the displacement axis "X" at a speed over about 2 m/s with an acceleration of at least about 30 m/s$^2$. One skilled in the art will understand that the speed and the acceleration of the displacing manipulator in the displacement direction, along the displacement axis "X", can vary in accordance with the properties of the bags including, and without being limited to, their material, size, or the like.

In an embodiment, in order to further help separating the topmost bag 12 from the second topmost bag 14, the displacing manipulator 50 displaces the topmost bag 12 along the displacement axis "X" in a counter direction, away from the second location (i.e. towards the first end 17 of the stack 16), and then in the displacement direction (i.e. towards the second location). In an embodiment, the topmost bag 12 is displaced of only a short distance in the counter direction, such as for example and without being limitative between a few millimeters and about 5 centimeters, before being displaced in the displacement direction. The initial displacement in the counter direction and the subsequent displacement in the displacement direction are consecutive. In a non-limiting embodiment, the displacement speed and acceleration of the displacing manipulator 50 can be faster in the displacement direction than in the counter direction. In an alternative embodiment, the displacement speed and acceleration of the displacing manipulator 50 in both directions, i.e. the counter direction and the displacement direction, can be about the same. One skilled in the art will however understand that, as described above, the topmost bag 12 can also be displaced by the displacing manipulator 50 solely in the displacement direction along the displacement axis "X".

It will be understood that the sequence of operation shown in FIGS. 2 to 8 is repeated to remove and displace the new topmost bag 12 of the stack 16, until the desired quantity of bags have been delivered to the second location, or the stack 16 is completely depleted. One skilled in that art will also understand that, as detailed above, the sequence of operation can vary from the embodiment shown in FIGS. 2 to 8 and described above.

Several alternative embodiments and examples have been described and illustrated herein. The embodiments of the invention described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while specific embodiments have been illustrated and described, numerous modifications come to mind without significantly departing from the scope of the invention as defined in the appended claims.

The invention claimed is:

1. An apparatus for repeatedly separating and displacing a topmost bag from a stack of bags including a second topmost bag located immediately under the topmost bag in the stack, each one of the topmost bag and the second topmost bag extending along a displacement axis "X" defined between a first end and an opposed second end of the stack and having a separation section proximate to the first end of the stack, the apparatus comprising:
   a stacking table having a stacking surface to support the stack of bags;
   a separating manipulator having at least one jointed link and being engageable with at least one bag of the stack supported by the stacking table, the at least one jointed link of the separating manipulator being configurable to move the separating manipulator between a bag engaging configuration and a lifted configuration to separate at least the separation section of the topmost bag from the separation section of the second topmost bag;
   a displacing manipulator having a prehension end-effector with a gripper selectively activable to seize and maintain a displacement engagement section of the topmost bag and selectively deactivable to release the topmost bag, the displacing manipulator also having a displacing manipulator actuator operatively connected to the prehension end-effector and configured to displace the prehension end-effector along the displacement axis "X" at an acceleration of at least about 5.5 m/s$^2$ to displace the topmost bag between a bag stack location and a second location;
   a stack level detector detecting a vertical position of the topmost bag of the stack of bags; and
   a displacement assembly actuator operatively connected to the stack level detector and displacing vertically at least one of the stacking table, the separating manipulator, and the displacing manipulator to maintain a predetermined vertical distance between the topmost bag of the stack and at least one of the separating manipulator and the displacing manipulator.

2. The apparatus of claim 1, further comprising a holding manipulator selectively configurable in a bag holding configuration to abut the second topmost bag and a disengaged configuration, spaced-apart from the stack and the holding manipulator comprises at least one stack engaging arm sized and shaped to allow the at least one stack engaging arm to brush against a section of the topmost bag when moved from the disengaged configuration to the bag holding configuration.

3. The apparatus of claim 1 wherein the displacement assembly actuator comprises a stacking table displacement assembly actuator operatively connected to the stack level detector, the stacking table displacement assembly actuator being configured to repeatedly adjust the vertical position of the stacking table according to the vertical position of the topmost bag detected by the stack level detector.

4. The apparatus of claim 1, wherein the displacement assembly actuator is configured to displace the prehension end-effector along the displacement axis "X" at least one of a speed over about 0.25 m/s and an acceleration of at least about 30 m/s$^2$.

5. The apparatus of claim 1, wherein the displacement assembly actuator is configured to displace the prehension end-effector along the displacement axis "X" in a counter direction towards the first end of the stack and in a displacement direction, opposed to the counter direction, consecutively.

6. The apparatus of claim 1, wherein the separating manipulator has a separating manipulator lifting stroke length and the displacing manipulator has a displacing manipulator lifting stroke length, the separating manipulator lifting stroke length being greater than the displacing manipulator lifting stroke length; and the displacement engagement section of the topmost bag is located between the second end of the stack and the separation section of the topmost bag, along the displacement axis "X".

7. The apparatus of claim 1, wherein the prehension end-effector of the displacing manipulator comprises a prehension device comprising at least one suction cup.

8. A method for repeatedly separating and displacing a topmost bag of a stack of bags along a displacement axis "X" extending between a first end and a second end of the stack, the stack also having a second topmost bag located immediately under the topmost bag in the stack, the method comprising the steps of:
   seizing and lifting a separation section of the topmost bag located proximate to the first end of the stack;
   seizing and lifting a displacement engagement section of the topmost bag located between the second end of the stack and the separation section of the topmost bag along the displacement axis "X";
   releasing the separation section of the topmost bag; and
   displacing the topmost bag along the displacement axis "X" at an acceleration of at least about 5.5 m/s$^2$.

9. The method of claim 8, further comprising the step of repeatedly adjusting a position of the stack of bags vertically to maintain a predetermined vertical distance between the topmost bag and a displacing manipulator displacing the topmost bag along the displacement axis "X".

10. The method of claim 8, further comprising the step of holding a section of the second topmost bag to substantially prevent displacement thereof following the seizing and lifting of a separation section of the topmost bag located proximate to the first end of the stack.

11. The method of claim 10, wherein the step of holding a section of the second topmost bag comprises moving at least one stack engaging arm from a disengaged configuration to a holding configuration, the method further comprising brushing the at least one stack engaging arm against a section of the topmost bag during the movement of the at least one stack engaging arm from the disengaged configuration to the holding configuration.

12. The method of claim 8, wherein the step of displacing the topmost bag along the displacement axis "X" comprises displacing the topmost bag along the displacement axis "X" at at least one of a speed over about 0.25 m/s and an acceleration of at least about 30 m/s$^2$.

13. The method of claim 8, wherein the step of displacing the topmost bag along the displacement axis "X" comprises displacing the topmost bag along the displacement axis "X" at a speed over about 2 m/s.

14. The method of claim 8, wherein the step of displacing the topmost bag along the displacement axis "X" comprises displacing the topmost bag along the displacement axis "X" in a counter direction towards the first end of the stack and in a displacement direction, opposed to the counter direction, consecutively.

15. A method for repeatedly separating and displacing a topmost bag of a stack of bags along a displacement axis "X" extending between a first end and a second end of the stack, the stack also having a second topmost bag located immediately under the topmost bag in the stack, the bags of the stack having a separation section proximate to the first end of the stack, the method comprising the steps of:
  separating the separation section of the topmost bag from the separation section of the second topmost bag; and
  repeatedly carrying out:
    seizing and lifting a displacement engagement section of the topmost bag located between the second end of the stack and the separation section of the topmost bag along the displacement axis "X", using a displacing manipulator;
    displacing the topmost bag along the displacement axis "X" at an acceleration of at least about 5.5 m/s$^2$, using the displacing manipulator; and
    adjusting a vertical position of at least one of the stack of bags and the displacing manipulator to maintain a predetermined vertical distance between the topmost bag of the stack and the displacing manipulator.

16. The method of claim 15, wherein the step of separating the separation section of the topmost bag from the separation section of the second topmost bag is carried out repeatedly, the step of separating the separation section of the topmost bag from the separation section of the second topmost bag being carried out prior to each repetition of the steps of seizing and lifting a displacement engagement section of the topmost bag and displacing the topmost bag along the displacement axis "X" with the displacing manipulator.

17. The method of claim 15, further comprising the step of monitoring a vertical position of the topmost bag of the stack.

18. The method of claim 15, wherein the step of displacing the topmost bag along the displacement axis "X" comprises at least one of displacing the topmost bag along the displacement axis "X" at a speed over about 0.25 m/s and displacing the topmost bag along the displacement axis "X" at an acceleration of at least about 30 m/s$^2$.

19. The method of claim 15, wherein the step of displacing the topmost bag along the displacement axis "X" comprises displacing the topmost bag along the displacement axis "X" at a speed over about 2 m/s.

20. The method of claim 15, wherein the step of displacing the topmost bag along the displacement axis "X" comprises displacing the topmost bag along the displacement axis "X" in a counter direction towards the first end of the stack and in a displacement direction, opposed to the counter direction, consecutively.

* * * * *